UNITED STATES PATENT OFFICE.

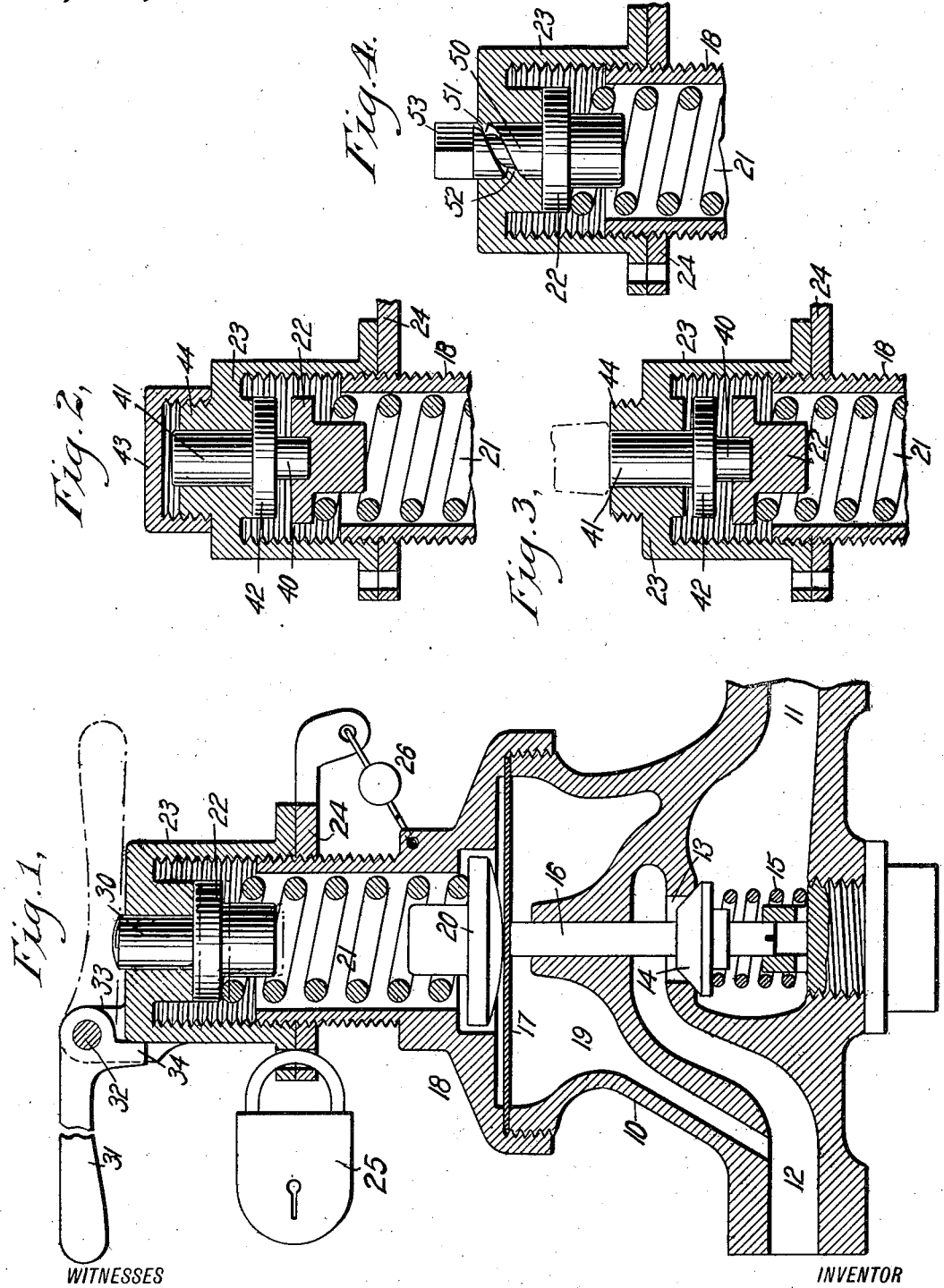

JULES P. METZGER, OF CARLSTADT, NEW JERSEY, ASSIGNOR TO THE LESLIE COMPANY, OF LYNDHURST, NEW JERSEY.

PRESSURE-REGULATOR.

1,244,226.               Specification of Letters Patent.        Patented Oct. 23, 1917.

Application filed January 24, 1916. Serial No. 73,900.

*To all whom it may concern:*

Be it known that I, JULES P. METZGER, a citizen of the United States, and a resident of Carlstadt, in the county of Bergen and State of New Jersey, have invented new and useful Improvements in Pressure-Regulators, of which the following is a full, clear, and exact description.

The invention relates to fluid pressure regulators in which a diaphragm controls the action of main valve, the diaphragm being pressed on at one side by a spring device and at the other by fluid pressure so that the high pressure fluid passing through the regulator is discharged from the latter at a predetermined lower pressure. This type of pressure regulator is used in an apparatus requiring an accurate functioning under a practically constant pressure, involving very little movement of the parts, and after the pressure regulator is set to the predetermined pressure it is locked or sealed or both to prevent the operator in charge from tampering with the pressure regulator.

The object of the invention is to provide certain new and useful improvements in pressure regulators of the type referred to whereby the locomotive engineer or other person is enabled to relieve the pressure regulator without unlocking it or breaking the seal in case the pressure regulator functions improperly for the time being by being clogged by sediment, or by the use of wet steam, or other causes.

In order to accomplish the desired result, use is made of an auxiliary means arranged on the pressure regulator and operable from the outside by an operator for suddenly and violently disturbing the interior mechanism of the regulator to dislodge any foreign matter that may obstruct the proper functioning of the regulator or to hold open the main valve more fully for the quick passage of the wet steam.

A practical embodiment of the invention is represented in the accompanying drawings forming a part of this specification, in which similar characters of reference indicate corresponding parts in all the views.

Figure 1 is a sectional side elevation of a pressure regulator provided with the improvement;

Fig. 2 is a sectional side elevation of a modified form of the improvement as applied to the spring device of the pressure regulator;

Fig. 3 is a similar view of the same with the parts in a different position; and Fig. 4 is a sectional side elevation of another modified form of the improvement as applied to the spring device of a pressure regulator.

The body 10 of the pressure regulator illustrated in Fig. 1 is provided with an inlet 11 connected with a boiler or other source of motive agent supply, and the body is provided with an outlet 12 for supplying steam or other motive agent to the machine to be driven; for instance, a turbo-generator for the electric headlight of a locomotive. A valve seat 13 within the body 10 connects the inlet 11 with the outlet 12 and this valve seat is controlled by a valve 14 normally held to its seat by a light spring 15. The upper end of the stem 16 of the valve 14 abuts against the under side of a diaphragm 17 held in place on the top of the body 10 by a bonnet 18, and the under side of the diaphragm 17 faces a chamber 19 connected with the outlet 12 so that the motive agent from the outlet can pass into the chamber 19 to exert a pressure against the under side of the diaphragm 17. The top of the diaphragm 17 is pressed on by a spring device having a bottom seat or button 20 seated on the top of the diaphragm 17 at the center thereof directly opposite the stem 16, and on this seat 20 rests the lower end of a coil spring 21 extending within the bonnet 18 and resting with its upper end on the under side of a top seat 22 abutting against a cap 23 screwed or otherwise secured to the bonnet 18 and locked in place thereto by a jam nut 24. By screwing the cap 23 up or down on the bonnet 18 any desired tension can be given to the spring 21 to set the pressure regulator to a predetermined pressure. This is usually done by the electrician installing the headlight apparatus for a locomotive, for instance, and when the instalment is completed the cap 23 and the nut lock 24 are locked in place by a suitable lock 25. Use may also be made of a seal 26 connecting the nut lock 24 with the bonnet 18 to prevent tampering of the regulator by the locomotive engineer or other person in charge of the apparatus. The pressure regulator so far described is one of the well known types to which the improvements are applicable, and I do not limit myself to the use of the improvements on this particular type of pressure regulator.

The improvements are arranged as follows: The seat 22 is provided with a stem 30 which extends through the top of the cap 23 to a short distance beyond the same to enable the locomotive engineer or other operator to strike the stem 30 with a hammer or other tool to force the seat 22 downward and thus increase the tension on the spring 21 and consequently the pressure on the top of the diaphragm 17 so that the valve 14 is moved farther into open position and at the same time the valve is violently jarred so that in case sediment or other foreign matter has clogged the movement of the valve 14 such foreign matter is shaken loose or dislodged and is carried off by the motive agent. In a like manner if wet steam hinders the proper functioning of the valve 14 then such steam can readily escape by the wide open valve 14 thus relieving the valve and allowing it to function properly. It is understood that the stem 30 may be given repeated blows by the use of a hammer or other tool until the desired relief is obtained.

Instead of the use of a hammer or similar tool, use may be made of a handle 31 fulcrumed at 32 on lugs 33 cast or attached to the cap 23, and this handle 31 can be used for screwing the cap 23 up or down on the bonnet 18 at the time the pressure regulator is set to a predetermined pressure by the electrician, as previously explained, or the handle 31 may be swung over onto the top of the stem 30 to enable the engineer to move the handle 31 up or down with a view to exert blows on the stem 30. After the pressure regulator has been set, as previously explained, the handle 31 is swung over onto the stem 30 to rest in folded position thereon and thus take up very little room, as will be readily understood by reference to the dotted lines in Fig. 1.

In the modified form shown in Fig. 2, the spring device for the diaphragm 17 is the same, but in this case the upper seat 22 is seated on a projection 40 depending from a collar 42 of a stem 41 slidable in the top of the cap 23, the collar 42 normally resting against the under side of the top of the cap 23. The stem 41 projects slightly beyond the top of the cap 23 so as to enable the engineer to strike blows on the stem 41 by the use of a hammer or other tool for the purpose previously explained. An auxiliary cap 43 screws on a threaded boss 44 on the top of the cap 23 to normally close the projecting end of the stem 41, it being understood that this cap 43 is to be removed to enable the engineer to strike blows on the stem 41, as before explained and shown in Fig. 3.

In the modified form shown in Fig. 4, the spring device is the same as above described and shown in Fig. 1, and in this case the stem 50 projecting from the seat 22 is provided with a spiral groove 51 engaging a tooth 52 formed in the cap 23. The upper end 53 of the stem 50 is made of polygonal shape for the convenient application of a wrench to enable the locomotive engineer to turn the stem 50 with a view to move the latter downward for increasing the tension on the spring 21 to obtain the desired relief, as previously explained. It is understood that the turning of the stem 50 causes a downward movement thereof, owing to the tooth 52 engaging the spiral groove 51.

In the foregoing, special reference has been made to the use of the improved pressure regulator in electric headlight installation for locomotives for the reason that in such installation the pressure regulator is put to a very severe test as a deviation of even a pound or so in the pressure of delivery of the motive agent materially affects the revolutions of the generator and consequently the electric headlight. It will be observed that in order to obtain an approximately constant pressure a very sensitive regulator is necessary and hence the working parts of the regulator have to be very closely fitted and have very little movement. Thus wet steam or minute particles of sediment or extraneous matter carried along by the motive agent are liable to clog the mechanism of the pressure regulator. By the improvement above described, the locomotive engineer is enabled to relieve the pressure regulator of the disturbance without changing or altering the setting of the pressure regulator, as the same are equally well adapted to the piston valve type.

Another fact is that the headlight is used only part of the time and the regulator stands idle during the day, therefore, the smoothness of the controlling valve is impaired through the drying and sealing of the particles referred to, which, without this improvement, cannot be relieved. This is better illustrated from the fact that in this locomotive headlight service, the engineer has not the control of the regulator, and, as is usually the rule on railroads, the electrician or other assistant is responsible for the rendering of proper light. These conditions prevail to such an extent that the proper number of revolutions of the generator to give the constant light are obtained by setting the adjusting device of the regulator to the predetermined pressure, which is done by the electrical expert after the regulator has been properly tested.

The regulator is then locked so that no one else can change it, and, as stated in my previous application for patent, sometimes these regulators are then sealed so that the locomotive engineer nor any one except the proper authority can unlock or break the seal and so change the predetermined pressure at which the regulator is set. This is most essential in view of the legal obligations of the railroads to the State, and the serious, possibly disastrous, consequences which would result at night through the failure of the headlight service. However, as above stated, the very fact that the changing of the adjustment of the regulator related to proper generating light service is prevented by leaving the adjustment and testing in charge of the expert outside of the operating engineer is an element of possible danger; a variable condition arises, priming occurs in boiler and wet steam is lifted, producing a condition, which, even on the road, might create trouble in the light, and from which the engineer could not help himself.

As also stated before, some particles or sediment might lodge upon and around the controlling valve stem, where the clearance is very, very limited for proper functioning, and dry there while the regulator is not in operation. Something must be done to prevent such a condition arising, and this is the reason for the present invention.

While the lock or seal absolutely prevents the engineer or any other man from changing the predetermined pressure at which the regulator was set after being tested, the engineer can, by a series of blows or jerks on top of the plunger seat, transmit to the seat 22, spring 21, bottom seat 20 and diaphragm 17 movement to the controlling valve 14.

It will also be noticed that by the arrangement described, the pressure regulator can be tested as to its proper working. For instance, if the diaphragm is broken and the stem 30 is pressed down by the engineer, steam will escape through the stem opening in the cap 23, and if the diaphragm is buckled the stiffness thereof becomes apparent on forcing down the stem 30, and likewise if the spring device or any part thereof is broken this fact also becomes apparent.

It will be noted further that the spherical surface of the lower face of the button 20 makes a contact of the button with the diaphragm at one point and that point in a line coinciding with the longitudinal axis of the valve stem 16. By this arrangement sudden percussion on the stem 30 will be transmitted through the coiled spring 21, the button 20 and the diaphragm 17 and thence to the valve stem 16. The button 20 is in contact with the diaphragm 17 but not connected thereto.

Having thus described my invention, I claim as new and desire to secure by Letters Patent:

1. In a locked or sealed pressure regulator, a spring-actuated valve having an axial stem projecting upwardly therefrom, a diaphragm engaging and controlling said valve stem, a set spring means contacting said diaphragm opposite the valve stem and in a line coincident with the axis of said valve stem, said spring means including a stem acted upon by the spring of the said means and extending upwardly to the outside of the regulator, the portion of the stem outside of the regulator being adapted to receive percussions and transmit same through the spring to the diaphragm to cause vibrations of the said valve.

2. In a locked or sealed pressure regulator, a casing, a diaphragm therein, a spring pressed valve having an upwardly extending valve stem engaging the lower face of said diaphragm, a button having a spherical surface contacting with the upper face of the diaphragm in line with the axis of the valve stem, a disk-like member mounted in the casing and having a portion projecting through the top of the casing to permit it to receive a blow from a hammer or the like, and a coiled spring interposed between said disk-like member and the spherical surfaced button.

3. In a locked or sealed pressure regulator, a main valve, a diaphragm controlling the main valve, a set spring device contacting at a single point the said diaphragm, a stem acted upon by the said spring device and extending to the outside of the regulator, and a handle fulcrumed at one end on the outside of the regulator and adapted to be swung over the regulator into engagement with the outer end of the said stem or to extend laterally from the regulator.

4. In a locked or sealed pressure regulator, a spring pressed valve, a diaphragm controlling the valve, a set spring device contacting the said diaphragm at a single point and abutting at its outer end against a screw cap held immovable by the lock or seal, a stem acted upon by the said spring device and extending through the said cap to the outside thereof, and a handle fulcrumed at one end on the said cap for screwing up or unscrewing the same when unlocked and unsealed, the said handle being adapted to be swung over the regulator into percussive engagement with the outer end of the said stem.

5. In a pressure regulator of the character described, a casing, a spring pressed valve in the casing, a bonnet on the casing, a diaphragm between the casing and bonnet and against which the valve stem abuts, an adjustable apertured cap on the bonnet, a spring device in the bonnet having a movable contact with the diaphragm, said spring having its tension controlled by the cap, means for locking the cap to the bonnet to prevent the regulator from being tampered with after it has been set to a predetermined pressure, and a stem extending loosely into the aperture of the cap and held with its outer end projected beyond the outer face of the cap by the said spring to permit it to receive percussions to jar the valve to relieve it of obstruction.

6. In a regulator of the character described, a casing, a spring pressed valve, in the casing, a bonnet on the casing, a diaphragm between the casing and bonnet and against which the end of the valve stem abuts, an adjustable apertured cap on the bonnet, a spring device in the bonnet and acting by contact only on the diaphragm, said spring having its tension controlled by said cap, means for locking the cap to the bonnet to prevent the regulator from being tampered with after it has been set to a predetermined pressure, a disk in the bonnet engaged by the spring and having a stem extending loosely into the aperture of the cap and held with its outer end projected beyond the outer face of the cap, and a handle pivoted to the top of the cap and adapted to be swung into percussive engagement with the said stem and thereby jar the valve.

In testimony whereof I have signed my name to this specification in the presence of two subscribing witnesses.

JULES P. METZGER.

Witnesses:
 THEO. G. HOSTER,
 PHILIP D. ROLLHAUS.